United States Patent
Freeman et al.

(10) Patent No.: US 10,042,688 B2
(45) Date of Patent: Aug. 7, 2018

(54) SELF-DIAGNOSIS OF DEVICE DRIVE-DETECTED ERRORS AND AUTOMATIC DIAGNOSTIC DATA COLLECTION

(71) Applicant: HGST Netherlands B.V., Amsterdam (NL)

(72) Inventors: Thomas Freeman, Rochester, MN (US); Nathan Allan Rabe, Rochester, NM (US)

(73) Assignee: Western Digital Technologies, Inc., San Jose, CA (US)

( * ) Notice: Subject to any disclaimer, the term of this patent is extended or adjusted under 35 U.S.C. 154(b) by 44 days.

(21) Appl. No.: 15/058,834

(22) Filed: Mar. 2, 2016

(65) Prior Publication Data
US 2017/0255535 A1 Sep. 7, 2017

(51) Int. Cl.
*G06F 11/07* (2006.01)
*G06F 11/34* (2006.01)

(52) U.S. Cl.
CPC ........ *G06F 11/0766* (2013.01); *G06F 11/349* (2013.01)

(58) Field of Classification Search
CPC ............. G06F 11/0766; G06F 11/0772; G06F 11/2221; G06F 11/3466–11/3495
USPC .................................................. 714/38.1, 45
See application file for complete search history.

(56) References Cited

U.S. PATENT DOCUMENTS

| | | | |
|---|---|---|---|
| 5,852,720 A * | 12/1998 | Gready | G06F 11/0709 709/217 |
| 6,067,262 A | 5/2000 | Irrinki et al. | |
| 6,467,054 B1 | 10/2002 | Lenny | |
| 6,591,358 B2 | 7/2003 | Jaffrey | |
| 6,895,500 B1 | 5/2005 | Rothberg | |
| 7,320,125 B2 * | 1/2008 | Elliott | G06F 11/0715 714/38.11 |

(Continued)

FOREIGN PATENT DOCUMENTS

JP        H 04-264627        9/1992

OTHER PUBLICATIONS

International Search Report and Written Opinion from PCT/US2017/020280, dated Aug. 4, 2017, 11 pages.

(Continued)

*Primary Examiner* — Joseph R Kudirka
(74) *Attorney, Agent, or Firm* — McDermott Will & Emery LLP

(57) ABSTRACT

A self-diagnostic device driver includes a memory that stores machine instructions and a processor coupled to the memory that executes the machine instructions to record an operational history associated with the device driver. The processor further executes the machine instructions to detect an error associated with the device driver, remove an associated driver from service, and automatically replicate a sequence of device driver operations corresponding to a segment of the operational history immediately preceding detection of the error. The processor also executes the machine instructions to automatically record a diagnostic history associated with the device driver while replicating the sequence of device driver operations. After the sequence has been replicated, the device is returned to service.

20 Claims, 3 Drawing Sheets

(56) References Cited

U.S. PATENT DOCUMENTS

| | | | |
|---|---|---|---|
| 7,366,944 B2* | 4/2008 | Oshins | G06F 11/1438 |
| | | | 714/2 |
| 7,849,364 B2 | 12/2010 | Callender | |
| 8,639,984 B2* | 1/2014 | McNeeney | G06F 11/366 |
| | | | 714/38.1 |
| 2005/0157325 A1 | 7/2005 | Choi et al. | |
| 2005/0210329 A1 | 9/2005 | Goss et al. | |
| 2009/0276793 A1 | 11/2009 | Cabezas et al. | |
| 2010/0162050 A1* | 6/2010 | Cathro | G06F 11/3476 |
| | | | 714/44 |
| 2011/0314335 A1 | 12/2011 | Tanaka | |
| 2014/0380284 A1 | 12/2014 | Rivkin | |

OTHER PUBLICATIONS

Writing Device Drivers, Oracle, Sep. 2010, 620 pages, retrieved from https://docs.oracle.com/cd/E18752_01/pdf/816-4854.pdf.

* cited by examiner

SELF-DIAGNOSIS OF DEVICE DRIVE-DETECTED ERRORS AND AUTOMATIC DIAGNOSTIC DATA COLLECTION

TECHNICAL FIELD

This description relates generally to diagnostic data and, more particularly, to automatic diagnostic data collection for device drivers.

BACKGROUND

Device drivers act as an interface between the host operating system of a computer and attached hardware devices. The device drivers generally enable the operating system to communicate with internal and peripheral devices, such as keyboards, pointing devices, monitors, printers, network cards, storage devices, and the like. The device drivers typically receive input/output (I/O) or administrative commands from application programs or the host operating system. The device driver may pass these commands on to the associated hardware device, translate the commands into device-specific commands, or perform any prerequisite or subsequent management operations. Device drivers typically are provided by the hardware device manufacturer, although device drivers may be included in an operating system package.

On occasion, device drivers may encounter errors while managing devices. The device drivers may also receive error notifications from the associated hardware device or the host operating system. Such errors may be related to the host system, the device driver, the hardware device, or complex interactions between these components. Particularly in production scenarios, the root cause of an error often may not be obvious.

As a result, some existing systems implement a trace mechanism that records operational information that can aid operators, such as system developers or technicians, in troubleshooting device driver errors. However, in general, making a detailed record requires system resources, which can negatively impact system performance. As a result, available trace mechanisms sometimes are not enabled in the field.

In general, if insufficient recorded debugging information is available, the troubleshooting process may require that relatively detailed trace recording be temporarily enabled and that the problem be manually recreated. This process can be relatively time-consuming, may only be successful after an operator has been able to experimentally reproduce the precise sequence of steps that resulted in the error, and may not be permissible in some production scenarios.

SUMMARY

According to one embodiment of the present invention, an apparatus for self-diagnosis of a device driver includes a memory that stores machine instructions and a processor coupled to the memory that executes the machine instructions to record an operational history associated with the device driver. The processor further executes the machine instructions to detect an error associated with the device driver and automatically replicate a sequence of device driver operations corresponding to a segment of the operational history preceding detection of the error. The processor also executes the machine instructions to automatically record a diagnostic history associated with the device driver while replicating the sequence of device driver operations.

According to another embodiment of the present invention, a computer-implemented method of self-diagnosis for a device driver includes recording an operational history associated with the device driver and detecting an error associated with the device driver. The method further includes automatically replicating a sequence of device driver operations corresponding to a segment of the operational history preceding detection of the error. The method also includes automatically recording a diagnostic history associated with the device driver while replicating the sequence of device driver operations.

According to yet another embodiment of the present invention, a computer program product for self-diagnosis of a device driver includes a non-transitory, computer-readable storage medium encoded with instructions adapted to be executed by a processor to implement recording an operational history associated with the device driver and detecting an error associated with the device driver. The instructions are further adapted to implement automatically replicating a sequence of device driver operations corresponding to a segment of the operational history preceding detection of the error. The instructions are also adapted to implement automatically recording a diagnostic history associated with the device driver while replicating the sequence of device driver operations.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
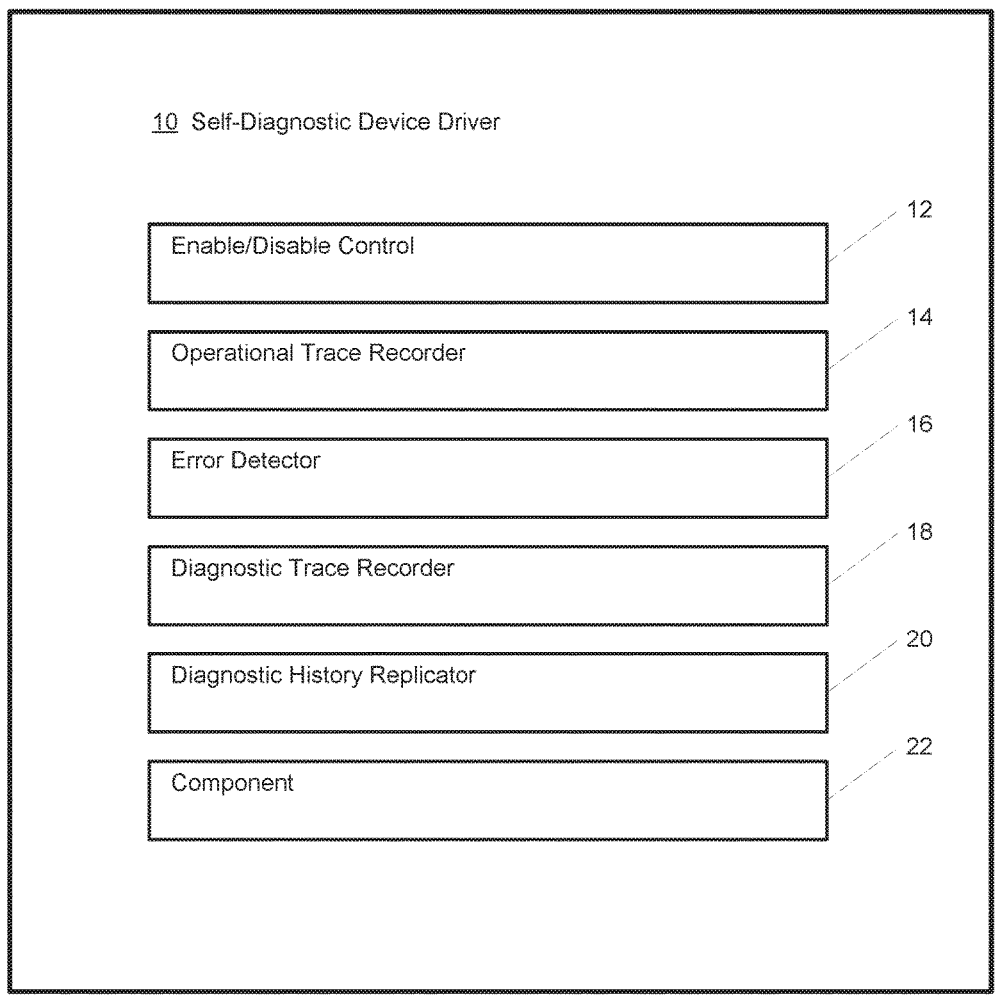
FIG. 1 is a block diagram illustrating an exemplary self-diagnostic device driver in accordance with an embodiment of the present invention.

An embodiment of the present invention is shown in FIG. 1, which illustrates an exemplary self-diagnostic device driver 10 that employs a self-diagnostic process in order to automatically collect diagnostic data regarding a hardware device that is communicatively connected to a computer system. The self-diagnostic device driver 10 can be implemented with hardware devices such as a hard disk drive (HDD), solid-state drive (SSD), other storage device, multiple storage devices, graphics card, network card, printer, monitor, keyboard, pointing device, or a communication bus. The self-diagnostic device driver 10 includes an enable/disable control 12, an operational trace recorder 14, an error detector 16, a diagnostic trace recorder 18, and a diagnostic history replicator 20.

The enable/disable control 12 is configured by the host computer to store a driver setting that may enable and/or disable the self-diagnostic functions of the self-diagnostic device driver 10. In some embodiments, the enable/disable control 12 is set by an explicit operator input. In other embodiments, the enable/disable control 12 is set according to a user-defined policy, for example, based on system conditions, failure rates, usage patterns, or the like.

In an embodiment, the enable/disable setting is configured by the host computer during initial driver installation and maintained in nonvolatile memory residing in the hardware device until such time that the setting is reconfigured. In alternative embodiments, the enable/disable setting may be set by the host during an initialization routine each time the device is powered up, for example, during a startup routine, and stored in volatile or nonvolatile memory residing in the hardware device, in the host computer, or in another device communicatively connected to the host computer.

During normal operation of the device with the self-diagnostic functions enabled, the operational trace recorder 14 stores, or records, a reduced or minimal operational history log of device driver operations or events. For example, in an embodiment, the operational trace recorder 14 stores a trace file memorializing system calls received by the self-diagnostic device driver 10 from the host computer operating system, device-protocol commands sent to the hardware device by the self-diagnostic device driver 10, and a synopsis of internal device driver routines performed by the self-diagnostic device driver 10.

In an embodiment, the operational trace recorder 14 maintains the operational history log in nonvolatile memory buffers residing in the hardware device. Thus, the operational history log generally will be available to the self-diagnostic device driver 10 after a commanded or uncommanded power down of the hardware device, any period of nonoperation, and hardware device restart and device driver initialization. In other embodiments, the operational trace recorder 14 maintains part or all of the operational history log in volatile memory buffers in the hardware device, or in nonvolatile or volatile memory residing in the host computer or another storage device.

In some embodiments, the operational trace recorder 14 additionally stores trace messages related to individual trace log entries to provide supplemental operational information. For example, the trace messages may include operational data used or produced by the self-diagnostic device driver 10 during operation.

The error detector 16 monitors (i.e., collects and evaluates data continuously, periodically or intermittently regarding) the hardware device operation and driver functions during normal operations and reviews operational information and signals to detect operational errors. The self-diagnostic device driver 10 and the hardware device are allowed to operate in a normal mode until an error is detected. In various embodiments, examples of types of errors that may be detected by the error detector 16 include insufficient available system or device resources; device configuration information errors; device resource registry errors; device firmware errors; incompatibilities between multiple connected devices; unsuccessful device management commands; unusable device; driver software corruption; or any other driver or device issue that can affect device operation.

When an error is detected, the self-diagnostic device driver 10 verifies the current setting of the enable/disable control 12. If the self-diagnostic function is currently disabled when an error is detected by the error detector 16, then the self-diagnostic device driver 10 does not store a trace file. When the self-diagnostic function setting is currently enabled at the time that an error is detected by the error detector 16, then the self-diagnostic device driver 10 temporarily halts normal operations and takes the hardware device out of service in order to perform a self-diagnosis procedure.

In an embodiment, during the period that the hardware device is removed from service, normal access to the device by the host computer is prevented and normal operations of the device are suspended so that the self-diagnosis procedure can be completed in relative isolation. In other embodiments, the hardware device may include multiple storage devices, for example, a redundant array of independent disks (RAID) or other redundancy solution, such as drive or volume mirroring. In these embodiments, the self-diagnostic device driver 10 may remove only a single storage device that encountered the error out of service, while continuing normal operations regarding the additional storage devices.

In order to perform the self-diagnosis procedure, the self-diagnostic device driver 10 initiates the diagnostic trace recorder 18, which stores, or records, an enhanced operational history log of device driver operations or events throughout the self-diagnosis procedure, for example, in a maximum serviceability mode. The self-diagnostic device driver 10 automatically initiates the diagnostic trace recorder 18, that is to say, without requiring input or intervention by an operator, such as a system developer or technician.

In an embodiment, the diagnostic trace recorder 18 stores a trace log memorializing a relatively complete, detailed diagnostic history log of operative procedures performed and data processed by the self-diagnostic device driver 10 in response to a detected error event. The diagnostic history log includes not only system calls received by the self-diagnostic device driver 10 from the host computer operating system and device-protocol commands sent to the hardware device by the self-diagnostic device driver 10, but also a detailed account of operative steps carried out by the self-diagnostic device driver 10 to perform internal device driver routines, along with a relatively complete listing of data operands used and data results produced by the self-diagnostic device driver 10 during the self-diagnostic procedure.

In an embodiment, the diagnostic trace recorder 18 maintains the diagnostic history log in nonvolatile memory buffers residing in the hardware device. In other embodiments, the diagnostic trace recorder 18 may maintain part or all of the operational history log in volatile memory buffers in the hardware device, or in nonvolatile or volatile memory residing in the host computer or another storage device. In some embodiments, the diagnostic trace recorder 18 additionally stores trace messages related to individual trace log entries to provide supplemental operational information.

During the self-diagnostic procedure, the diagnostic history replicator 20 uses information from the operational history log to attempt to duplicate the error by reproducing the precise sequence of operational steps previously performed by the self-diagnostic device driver 10 and the hardware device during normal operation that resulted in the detected error. Thus, the diagnostic history replicator 20 instructs the self-diagnostic device driver 10 to perform each of the operations reflected in the operational history log in sequence using data recorded in the operational history log or supplemental trace messages. The diagnostic history replicator 20 automatically replicates the operational history, that is to say, without requiring input or intervention by an operator, such as a system developer or technician.

For example, in an embodiment, the diagnostic history replicator 20 replicates device driver operations from a segment of the operational history log corresponding to a time period beginning at a set interval previous to the time at which the error was detected by the error detector 16 and ending at or after the time at which the error was detected. In an alternative embodiment, the diagnostic history replicator 20 replicates operations from a segment of the operational history log corresponding to a number of device driver operations beginning at a set number of operations previous to the point at which the error was detected by the error detector 16 and ending at or after the point at which the error was detected. Detailed diagnostic data is captured by the diagnostic trace recorder 18 while the diagnostic history replicator 20 reproduces the operational history of the self-diagnostic device driver 10.

In an alternative embodiment, when the operational history log is insufficient to define a precise sequence of procedural steps or ambiguities exist in the operational history log, the diagnostic history replicator 20 may introduce variations while repeating the replicated operations during multiple runs. For example, the diagnostic history replicator 20 may perform alternative procedural branches or use alternative data operands during repeated replications of the operational history log in an attempt to replicate the error.

In another alternative embodiment, the diagnostic history replicator 20 may limit the commands or procedures permitted during the recreate self-diagnosis procedure in order to avoid introducing system state changes that could affect subsequent device operation. In an embodiment, the self-diagnostic device driver 10 may perform a system check after completing the self-diagnosis procedure.

Once the self-diagnosis procedure has been completed, the self-diagnostic device driver 10 terminates the diagnostic trace recorder 18 and places the hardware device back in service. After the device is returned to service, normal access to the device by the host computer is allowed and normal operation resumes.

Thus, the self-diagnostic device 10 automatically collects and stores detailed diagnostic data at the system level while performing the operations that originally resulted in the detected error. In an embodiment, the detailed diagnostic data includes all device driver-to-hardware device communications. In some instances, the device driver-to-hardware device communications are initiated by multiple host processes or application programs. In addition to facilitating automatic problem recreation, the system-level data that is gathered can also be highly useful during subsequent manual problem investigation as compared to manual examination of individual process trace files, for example, aiding identification of errors resulting from interactions between device commands originating from multiple host processes.

Figure 2:
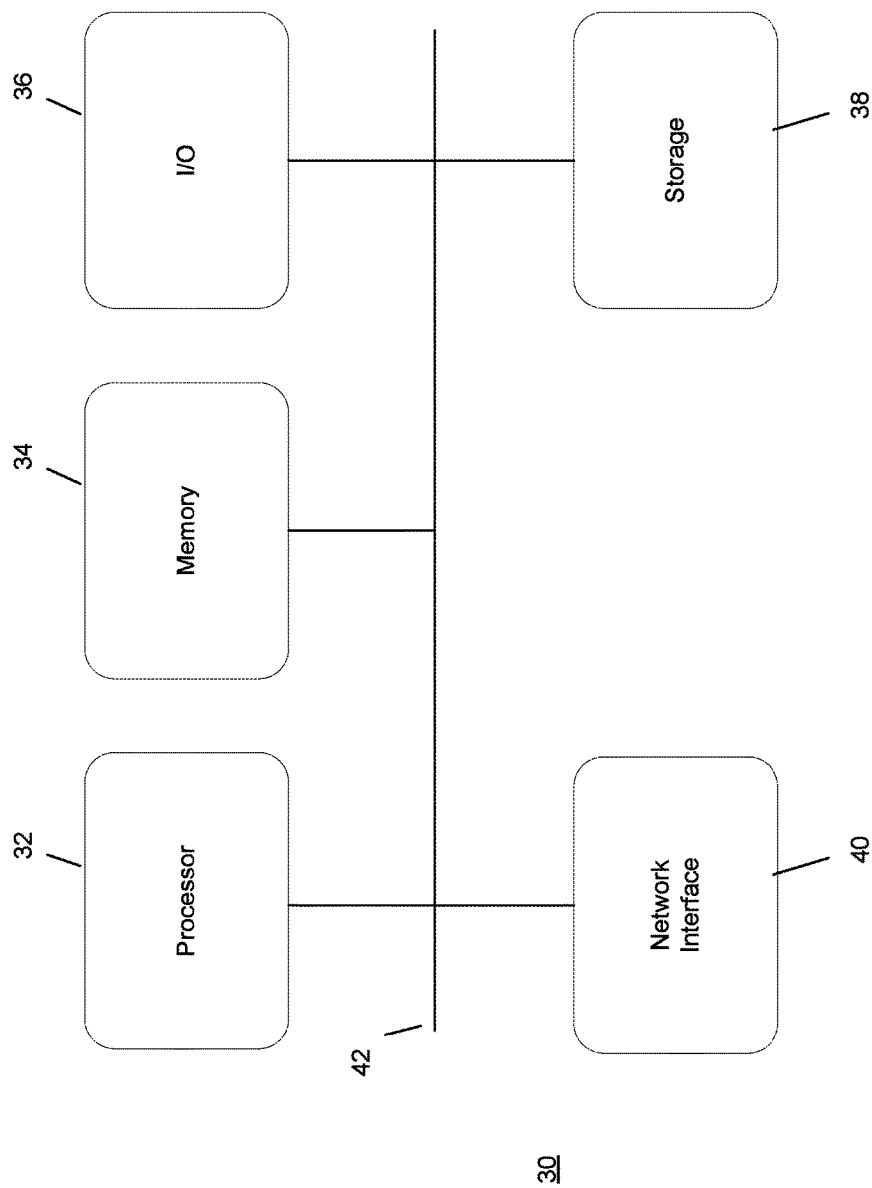
FIG. 2 is a schematic view depicting an exemplary general computing system that can implement the self-diagnosing device driver of FIG. 1.

As illustrated in FIG. 2, an exemplary general computing device 30 that can be employed in the self-diagnostic device driver 10 of FIG. 1 includes a processor 32, a memory 34, an input/output device (I/O) 36, a storage 38 and a network interface 40. The various components of the computing device 30 are coupled by a local data link 42, which in various embodiments incorporates, for example, an address bus, a data bus, a serial bus, a parallel bus, a storage bus, or any combination of these.

In some embodiments, the computing device 30 is coupled to a communication network 34 by way of the network interface 40, which in various embodiments may incorporate, for example, any combination of devices—as well as any associated software or firmware—configured to couple processor-based systems, including modems, access points, routers, network interface cards, LAN or WAN interfaces, wireless or optical interfaces and the like, along with any associated transmission protocols, as may be desired or required by the design.

The computing device 30 can be used, for example, to implement the functions of the components of the self-diagnostic device driver 10 of FIG. 1. In various embodiments, the computing device 30 can include, for example, a server, a workstation, a mainframe computer, a controller, a personal computer (PC), a desktop PC, a laptop PC, a tablet, a notebook, a personal digital assistant (PDA), a smart phone, a wearable device, or the like. Programming code, such as source code, object code or executable code, stored on a computer-readable medium, such as the storage 38 or a peripheral storage component coupled to the computing device 30, can be loaded into the memory 34 and executed by the processor 32 in order to perform the functions of the self-diagnostic device driver 10.

Figure 3:
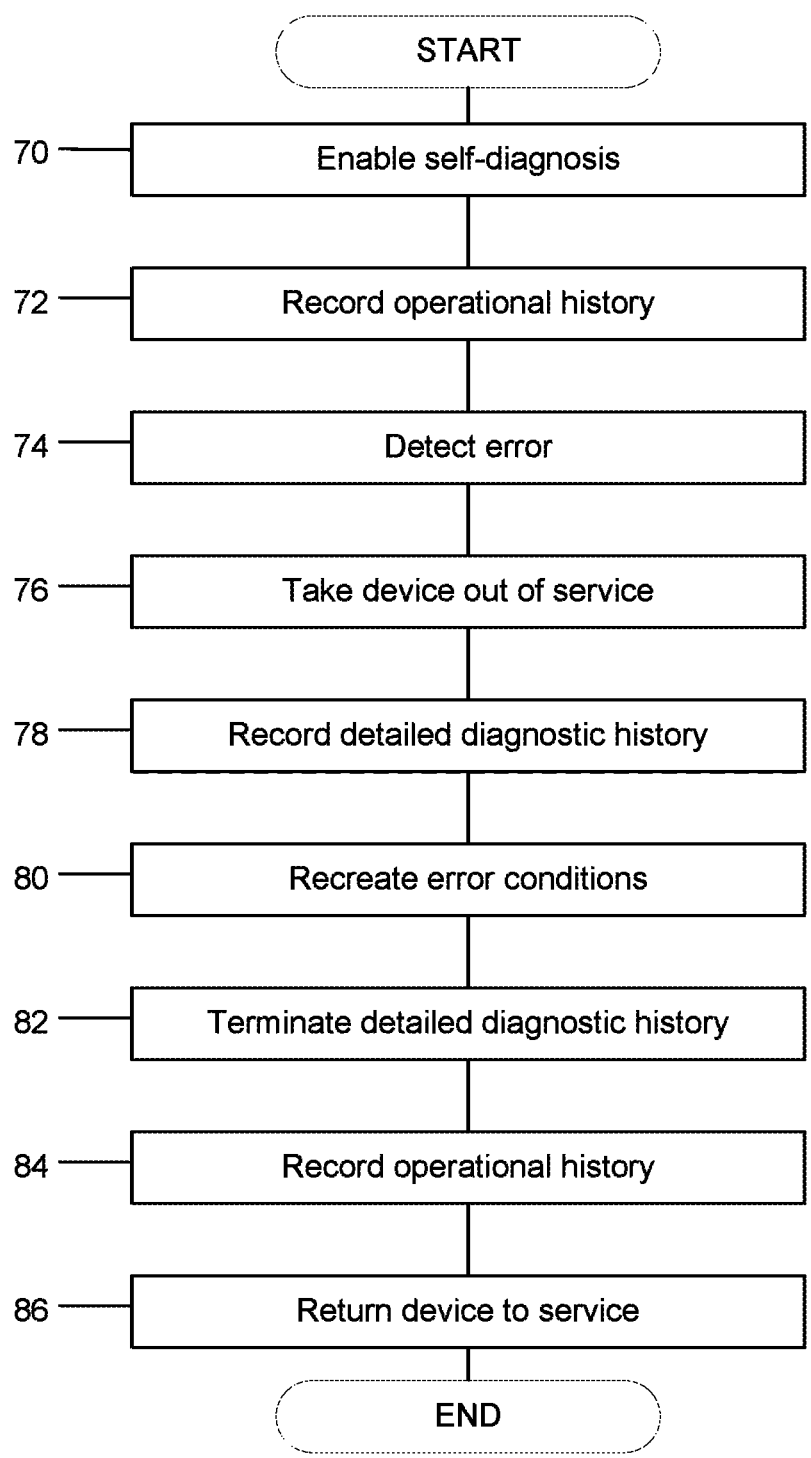
FIG. 3 is a flowchart representing an exemplary method of self-diagnosis and automatic data collection in accordance with an embodiment of the present invention.

Referring now to FIG. 3, an exemplary process flow is illustrated that may be performed, for example, by the self-diagnostic device driver 10 of FIG. 1 to implement an embodiment of the method described in this disclosure for self-diagnosis of a device driver to automatically collect diagnostic data regarding a hardware device that is communicatively connected to a computer system. The process begins at block 70, where the host computer system configures a device driver setting of an enable/disable control to enable the self-diagnostic function of the device driver, as described above.

In block 72, the device driver stores an operational history of driver operations using a trace mechanism during normal functioning of the device, as described above. Normal operations of the device continue until the device driver detects an error, in block 74. When an error is detected, the device driver removes the device from service and temporarily restricts access to the device during a self-diagnosis procedure, in block 76.

In block 78, the device driver stores an enhanced operational history, or detailed diagnostic history, of driver operations during the self-diagnosis procedure, as explained above. The device driver reproduces the sequence of operational steps recorded in the operational history immediately previous to the point of error detection, in block 80, in an attempt to recreate the error conditions, as explained above. Detailed diagnostic data is captured by the device driver during the recreate procedure.

In block 82, the device driver terminates the detailed diagnostic history recording and, in block 84, the device driver resumes recording the reduced operational history. In block 86, the device driver returns the device to service and allows normal access to the device, as explained above, so that normal device operations may resume.

The systems and methods described herein can offer advantages such as reducing or eliminating the need for manual troubleshooting, which generally will reduce the time between initial error detection and final error analysis. These systems and methods can reduce or minimize the system resources required, along with any associated degradation in system performance, to analyze detected device driver errors.

Aspects of this disclosure are described herein with reference to flowchart illustrations or block diagrams, in which each block or any combination of blocks can be implemented by computer program instructions. The instructions may be provided to a processor of a general purpose computer, special purpose computer, or other programmable data processing apparatus to effectuate a machine or article of manufacture and, when executed by the processor, the instructions create means for implementing the functions, acts or events specified in each block or combination of blocks in the diagrams.

In this regard, each block in the flowchart or block diagrams may correspond to a module, segment, or portion of code that includes one or more executable instructions for implementing the specified logical function(s). It should also be noted that, in some alternative implementations, the functionality associated with any block may occur out of the order noted in the figures. For example, two blocks shown in succession may, in fact, be executed substantially concurrently, or blocks may sometimes be executed in reverse order.

A person of ordinary skill in the art will appreciate that aspects of this disclosure may be embodied as a device, system, method or computer program product. Accordingly, aspects of this disclosure, generally referred to herein as circuits, modules, components or systems, or the like, may be embodied in hardware, in software (including source code, object code, assembly code, machine code, microcode, resident software, firmware, etc.), or in any combination of software and hardware, including computer program products embodied in a computer-readable medium having computer-readable program code embodied thereon.

It will be understood that various modifications may be made. For example, useful results still could be achieved if steps of the disclosed techniques were performed in a different order, and/or if components in the disclosed systems were combined in a different manner and/or replaced or supplemented by other components. Accordingly, other implementations are within the scope of the following claims.

What is claimed is:

1. An apparatus for self-diagnosis using a device driver, comprising:
   a memory that stores machine instructions; and
   a processor coupled to the memory and configured to execute the machine instructions, wherein the machine instructions, when executed, cause the processor to:
     implement the device driver as an interface between a first hardware device and a host computer;
     record an operational history associated with the device driver;
     detect an error associated with the device driver; and
     responsive to detecting the error and without user intervention, automatically stop the first hardware device from servicing the host computer, automatically replicate a sequence of device driver operations corresponding to a segment of the operational history that precedes detection of the error by repeating performance of the sequence of the device driver operations, automatically record a diagnostic history associated with the device driver while replicating the sequence of device driver operations, and instruct the first hardware device to resume servicing the host computer.

2. The apparatus of claim 1, wherein the device driver is further implemented as an interface between the host computer and a second hardware device, and wherein the machine instructions, when executed, further cause the processor to suspend, responsive to detecting the error, normal operations of the first hardware device while the sequence of device driver operations are automatically replicated, and while continuing normal operations of the second hardware device, and resume normal operations of the first hardware device after the sequence of device driver operations has been automatically replicated.

3. The apparatus of claim 1, wherein the machine instructions, when executed, further cause the processor to duplicate the error while the sequence of device driver operations are automatically replicated.

4. The apparatus of claim 1, wherein the machine instructions, when executed, further cause the processor to configure a control setting, wherein the sequence of device driver operations are automatically replicated and automatically recorded based on the control setting currently being configured to enable self-diagnosis.

5. The apparatus of claim 1, wherein the apparatus does not require an intervention by an operator to automatically replicate and automatically record the sequence of device driver operations.

6. The apparatus of claim 1, wherein the operational history corresponds to a period of normal operation of the first hardware device.

7. The apparatus of claim 1, wherein recording the operational history includes recording device driver operations associated with a plurality of processes associated with the host computer.

8. A method, comprising:
   implementing a device driver as an interface between a first hardware device and a host computer;
   recording an operational history associated with the device driver;
   detecting an error associated with the device driver;
   responsive to detecting the error and without user intervention, automatically suspending access to the first hardware device from a host computer, automatically replicating a sequence of device driver operations corresponding to a segment of the operational history that precedes detection of the error by repeating performance of the sequence of the device driver operations, automatically recording a diagnostic history associated with the device driver while replicating the sequence of device driver operations, and resuming access to the first hardware device from the host computer.

9. The method of claim 8, wherein the device driver is further implemented as an interface between the host computer and a second hardware device, the method further comprising:
   suspending, responsive to detecting the error, normal operations of the first hardware device associated with the device driver while automatically replicating the sequence of device driver operations, while continuing normal operations of the second hardware device and allowing access to the second hardware device from the host computer; and
   resuming normal operations of the first hardware device after automatically replicating the sequence of device driver operations.

10. The method of claim 8, further comprising duplicating the error while automatically replicating the sequence of device driver operations.

11. The method of claim 8, further comprising configuring a control setting, wherein the automatically replicating and automatically recording are only performed based on the control setting currently being configured to enable self-diagnosis.

12. The method of claim 8, wherein the segment of the operational history corresponds to a predetermined period of time.

13. The method of claim 8, wherein the segment of the operational history corresponds to a predetermined number of device driver operations.

14. The method of claim 8, wherein automatically replicating and automatically recording do not require an intervention by an operator.

15. The method of claim 8, further comprising sending a command from the device driver to a device communicatively connected with a host computer, wherein the device driver is executed on the host computer.

16. The method of claim 8, wherein the operational history corresponds to a period of normal operation of the first hardware device.

17. The method of claim 8, wherein recording the operational history includes recording at least one of a system call received by the device driver from an operating system associated with the host computer, a command sent to the first hardware device from the device driver, or a routine executed by the device driver.

18. The method of claim 8, wherein recording the operational history includes recording device driver operations associated with a plurality of processes associated with the host computer.

19. A computer program product for self-diagnosis of a device driver, comprising:
- a non-transitory, computer-readable storage medium encoded with instructions adapted to be executed by a processor to implement operations, comprising:
    implementing a device driver as an interface between a first hardware device and a host system;
    recording an operational history associated with the device driver;
    detecting an error associated with the device driver;
    responsive to detecting the error and without user intervention, automatically suspending access to the first hardware device from a host system, automatically replicating a sequence of device driver operations corresponding to a segment of the operational history that precedes detection of the error by repeating performance of the sequence of the device driver operations, automatically recording a diagnostic history associated with the device driver while replicating the sequence of device driver operations, and resuming access to the first hardware device from the host system.

20. The computer program product of claim 19, wherein the device driver is further implemented as an interface between the host system and a second hardware device, and wherein the operations further comprise:
    suspending, responsive to detecting the error, normal operations of the first hardware device associated with the device driver while automatically replicating the sequence of device driver operations, while continuing normal operations of the second hardware device and allowing access to the second hardware device from the host system; and
    resuming normal operations of the first hardware device after automatically replicating the sequence of device driver operations.

* * * * *